(12) United States Patent
Chiang

(10) Patent No.: US 8,299,725 B2
(45) Date of Patent: Oct. 30, 2012

(54) DRIVER FOR DRIVING LIGHT EMITTING DEVICE

(75) Inventor: Cheng-Lung Chiang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 290 days.

(21) Appl. No.: 12/830,448

(22) Filed: Jul. 6, 2010

(65) Prior Publication Data

US 2012/0007520 A1    Jan. 12, 2012

(51) Int. Cl.
*H05B 37/02* (2006.01)
(52) U.S. Cl. ......... 315/291; 315/299; 315/307; 315/160
(58) Field of Classification Search ................... 315/291, 315/293, 294, 299, 307, 160–161, 194–195
See application file for complete search history.

(56) References Cited

U.S. PATENT DOCUMENTS

| | | | |
|---|---|---|---|
| 6,774,673 B2 * | 8/2004 | Tsuboi et al. | 326/68 |
| 2008/0122516 A1 * | 5/2008 | Park et al. | 327/333 |
| 2010/0001983 A1 * | 1/2010 | Abe | 345/211 |

* cited by examiner

*Primary Examiner* — James H Cho
(74) *Attorney, Agent, or Firm* — Winston Hsu; Scott Margo

(57) ABSTRACT

A driver for driving a light emitting device includes an output stage and a driving stage. The output stage is for outputting a driving current to the light emitting device according to a driving signal, wherein the light emitting device is coupled between the output stage and a second reference voltage different from the first reference voltage. The driving stage is for generating the driving signal to the output stage, wherein one of the third reference voltage and the fourth reference voltage is within a range between the first reference voltage and the second reference voltage, and the other of the third reference voltage and the fourth reference voltage is outside the range between the first reference voltage and the second reference voltage.

12 Claims, 4 Drawing Sheets

DRIVER FOR DRIVING LIGHT EMITTING DEVICE

BACKGROUND OF THE INVENTION

1. Field of the Invention

The present invention relates to driving an input signal, and more particularly, to a driver for driving a light emitting device such as an organic light emitting diode (OLED).

2. Description of the Prior Art

A very large voltage (e.g. a driving voltage of 13V) is required to drive a conventional organic light emitting diode (OLED). As a result, a corresponding driving stage should be designed to work at 13V as well. To fabricate transistors capable of enduring such a high voltage swing, a high voltage (HV) semiconductor process is required. These HV devices are usually very large in size and consume a huge amount of power; in addition, if the OLED driver is designed to be integrated with a static random access memory (SDRAM), the HV device semiconductor process is the only choice and therefore the integration is implemented at the expense of the chip area and power consumption.

Please refer to FIG. 1, which is a diagram of a conventional OLED driver 100 and an OLED 101. The OLED driver 100 includes a driving stage 110 and an output stage 120. The driving stage 110 includes a level shifter 111, a digital-to-analog converter (DAC) 112, and a buffer 113. The output stage 120 includes a switch transistor M1 for receiving a switch signal SEL, a storage capacitor C and an output transistor M2. Since an output signal VOUT from the OLED driving stage 110 has a voltage swing of 13V to drive the output stage 120 to generate an output current IOUT, digital input signals VIN[5:0] are converted into a plurality of digital signals with a voltage swing of 13V by the level shifter 110, and then the converted digital signals are further converted into an analog signal by the DAC 120. Finally, the buffer 113 receives the analog signal to output the output signal VOUT.

As can be seen in FIG. 1, all the components within the driving stage 110 are forced to work under a supply voltage of 13V, leading to a very large amount of power consumption and chip size.

SUMMARY OF THE INVENTION

According to an embodiment of the present invention, an exemplary driver for driving a light emitting device is provided. The exemplary driver includes an output stage and a driving stage. The output stage is for outputting a driving current to the light emitting device according to a driving signal, wherein the light emitting device is coupled between the output stage and a second reference voltage different from the first reference voltage. The driving stage is for generating the driving signal to the output stage, wherein one of the third reference voltage and the fourth reference voltage is within a range between the first reference voltage and the second reference voltage, and the other of the third reference voltage and the fourth reference voltage is outside the range between the first reference voltage and the second reference voltage.

According to another embodiment of the present invention, an exemplary driver for driving a light emitting device is provided. The exemplary driver includes an output stage and a driving stage. The output stage is for outputting a driving current to the light emitting device according to a driving signal. The driving stage generates the driving signal to the output stage. The driving stage includes a first driving unit, a second driving unit and a combiner. The first driving unit receives an input signal and generates a first driving signal according to the input signal. The second driving unit receives the input signal and generates a second driving signal according to the input signal, wherein the second reference voltage is between the first reference voltage and the third reference voltage. The combiner generates the driving signal by combining the first driving signal and the second driving signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
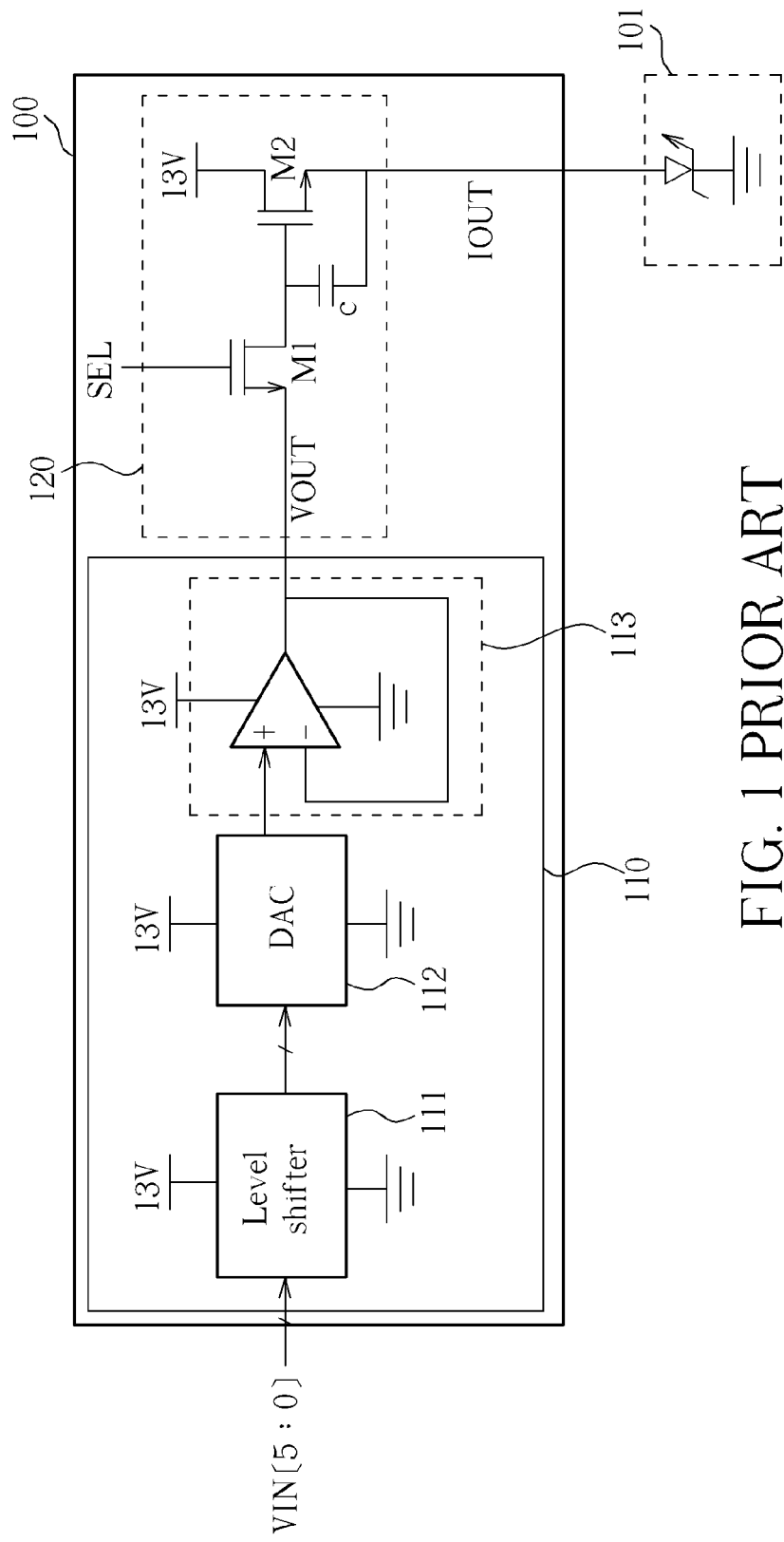
FIG. 1 is a diagram of a conventional OLED driver and an OLED.
Figure 2:
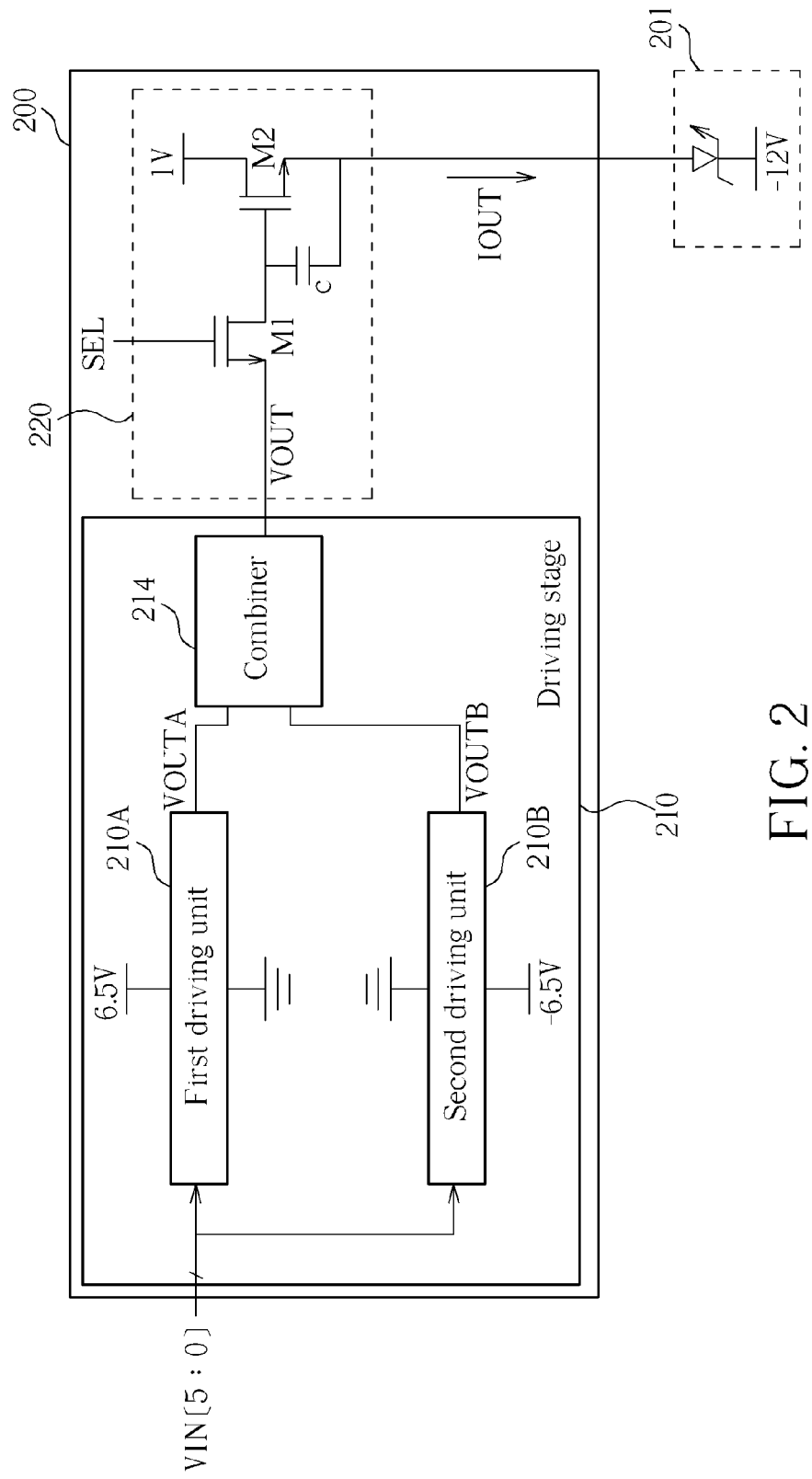
FIG. 2 is a diagram of a driver and an OLED according to an embodiment of the present invention.

Please refer to FIG. 2, which is a diagram of a driver 200 and an OLED 201 according to an embodiment of the present invention. As shown in FIG. 2, the driver 200 includes a driving stage 210 and an output stage 220. The output stage 220 is coupled to a first supply voltage (e.g., a reference voltage of 1V) for outputting a driving current IOUT to a light emitting device (e.g., the OLED 201 or other element capable of emitting light) according to a driving signal VOUT, wherein the OLED 201 is coupled between the output stage 220 and a second supply voltage (e.g., a reference voltage of −12V). The driving stage 210 is coupled to a third supply voltage (e.g. a reference voltage of 6.5V) and a fourth supply voltage (e.g. a reference voltage of −6.5V) for generating the driving signal VOUT to the output stage 220. Furthermore, the driving stage 210 includes a first driving unit 210A, a second driving unit 210B and a combiner 214. The first driving unit 210A is coupled to the third supply voltage (6.5V in this example, which is outside the range between 1V to −12V) and a reference ground (a reference voltage of 0V) for receiving the input signal VIN[5:0] and generating the first driving signal VOUTA according to the input signal VIN[5:0]. Likewise, the second driving unit 210B is coupled to the fourth supply voltage (−6.5V in this example, which is in the range between 1V to −12V) and the reference ground for receiving the input signal VIN[5:0] and generating the second driving signal VOUTB according to the input signal VIN[5:0]. The combiner 214 is coupled to the first driving unit 210A and the second driving unit 210B for generating the driving signal VOUT by combining the first driving signal VOUTA and the second driving signal VOUTB. Since the output stage 220 is coupled to the first reference voltage (i.e., 1V) and the OLED 201 is coupled to the second supply voltage (i.e., −12V), the signal driving the output stage 220 should be within the range of 6.5V ~−6.5V.

Figure 3:
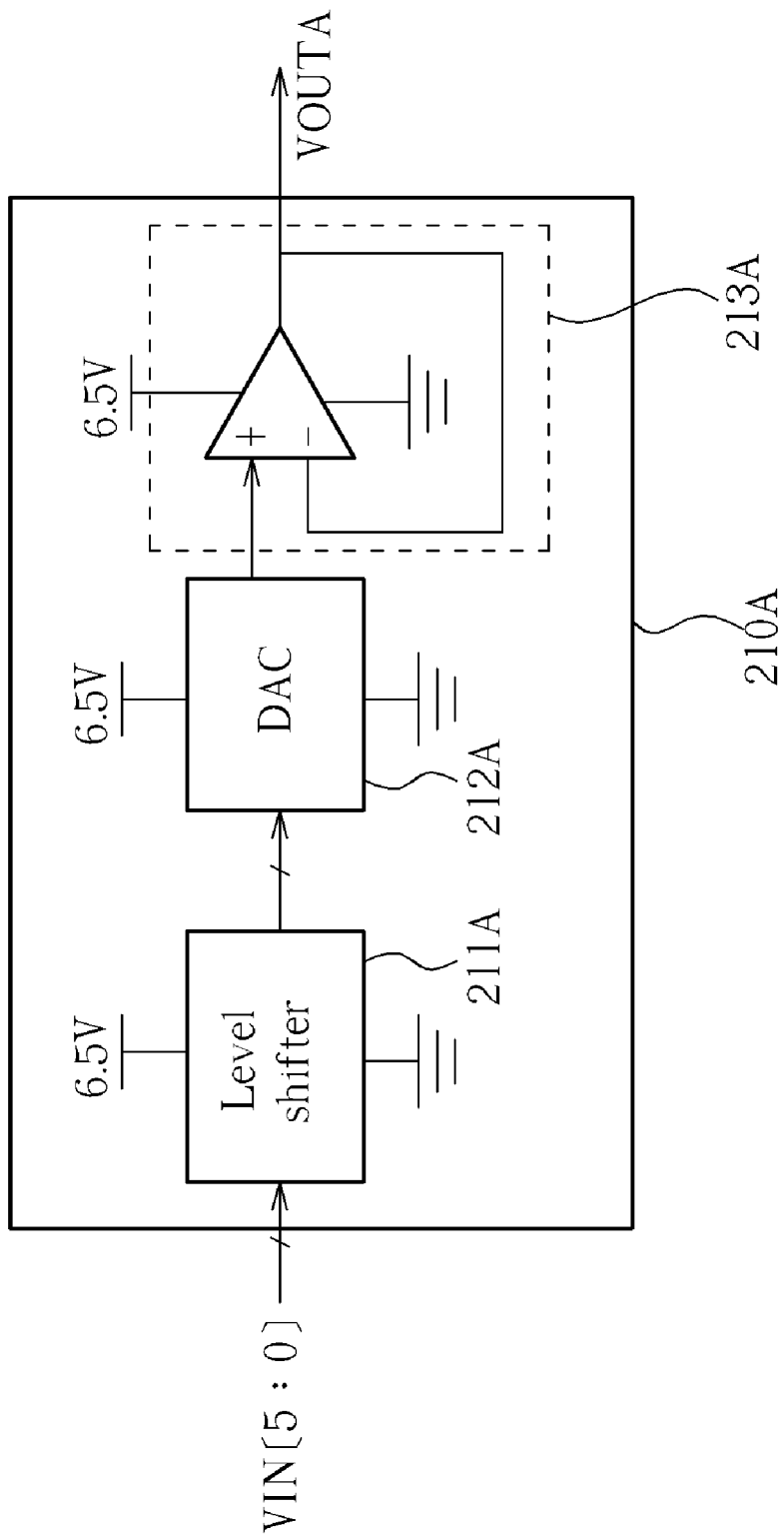
FIG. 3 is a diagram of an exemplary implementation of a first driving unit shown in FIG. 2.
Figure 4:
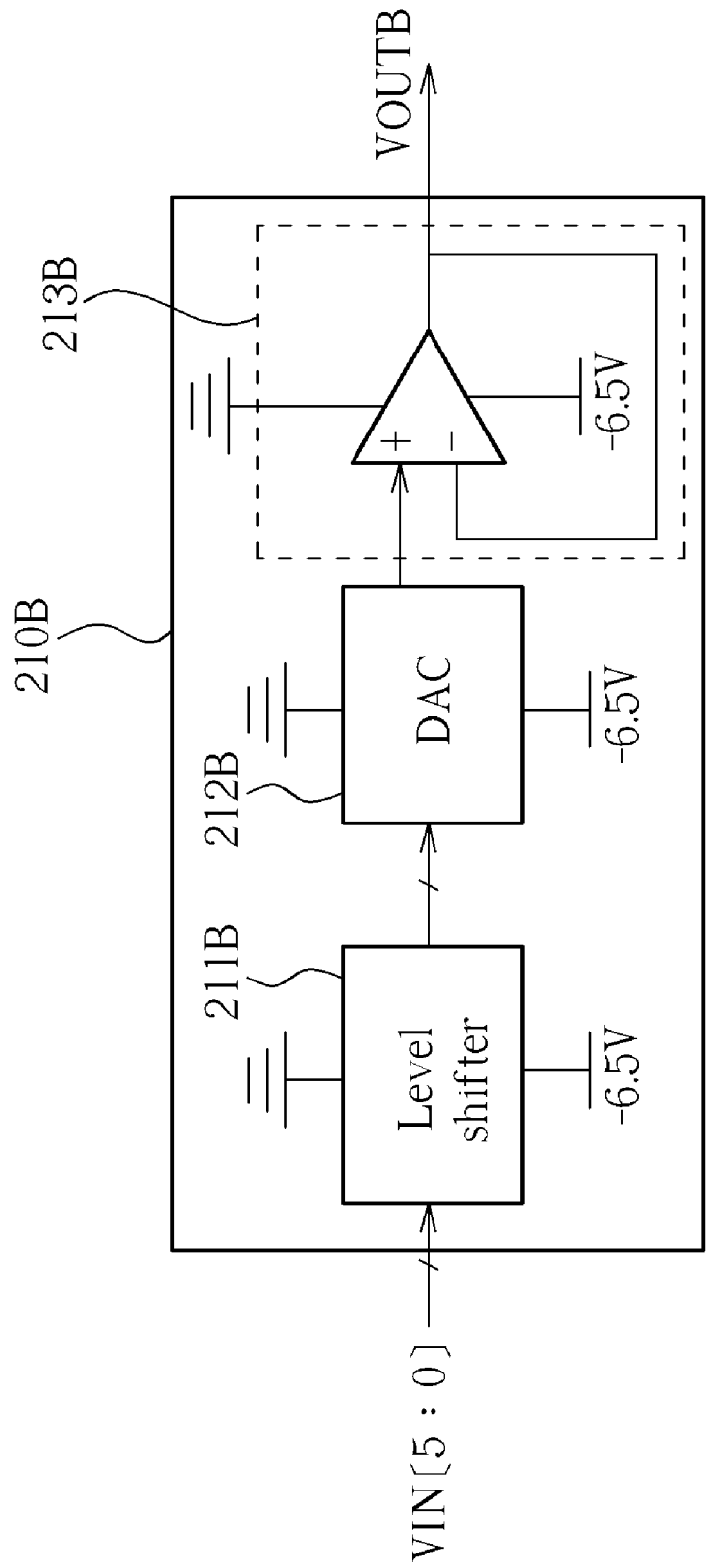
FIG. 4 is a diagram of an exemplary implementation of a second driving unit shown in FIG. 2.

Please refer to FIG. 3 for a detailed illustration of the first driving unit 210A. FIG. 3 is a diagram of an exemplary implementation of the first driving unit 210A shown in FIG. 2. The first driving unit 210A includes a first level shifter 211A, a first DAC 212A and a first buffer unit 213A. The first level shifter 211A receives the input signal VIN[5:0] and generates a first shifted signal according to the third supply voltage (i.e., 6.5V) and the reference ground (i.e., 0V). The first DAC 212A thereby converts the first shifted signal into a first driving signal, and the buffer unit 213A buffers the first driving signal voltage to generate the first driving signal VOUTA. Please refer to FIG. 4 in conjunction with FIG. 3. FIG. 4 is a diagram of an exemplary implementation of the second driving unit 210B shown in FIG. 2. Likewise, the function and structure of each block within the second driving unit 210B is substantially identical to the corresponding counterpart within the first driving unit 210A. More specifically, the second driving unit 210B includes a second level shifter 211B, a second DAC 212B and a second buffer unit 213B, the only difference being that the second driving unit 210B is supplied by the reference ground voltage and the fourth supply voltage, respectively, instead of the third supply voltage and the reference ground voltage. Further description is omitted here for brevity.

The combiner 214 generates the driving signal VOUT by combining the first driving signal VOUTA and the second driving signal VOUTB. In this embodiment, the combiner 214 may be simply realized by a connection node in the driving stage 210; however, the combiner 214 may also be implemented by a signal adder or a circuitry of similar functionally in other embodiments. These modifications all obey the spirit of the present invention.

In this embodiment, each component within the driver 200 is operated by a voltage drop of 6.5V or less. The driver 200, therefore, can be fabricated with a medium voltage (MV) semiconductor process to lower cost and power consumption. In addition, a static random access memory (SDRAM) device can be easily integrated with the driver 200.

In summary, the present invention provides a driver of a light emitting unit. By designing supply voltages of an output stage of the driver and the light emitting unit, the driving stage of the driver can be realized with a more economic process, leading to a smaller chip size and lower power consumption. In addition, the SDRAM can be easily integrated with the driver to provide greater advantages.

Those skilled in the art will readily observe that numerous modifications and alterations of the device and method may be made while retaining the teachings of the invention.

What is claimed is:

1. A driver for driving a light emitting device, comprising:
an output stage, coupled to a first reference voltage, for outputting a driving current to the light emitting device according to a driving signal, wherein the light emitting device is coupled between the output stage and a second reference voltage different from the first reference voltage; and
a driving stage, coupled to a third reference voltage and a fourth reference voltage, for generating the driving signal to the output stage, wherein one of the third reference voltage and the fourth reference voltage is within a range between the first reference voltage and the second reference voltage, and the other of the third reference voltage and the fourth reference voltage is outside the range between the first reference voltage and the second reference voltage, and the driving stage comprises:
a first driving unit, coupled to the third reference voltage and a fifth reference voltage, for receiving an input signal and generating a first driving signal according to the input signal;
a second driving unit, coupled to the fourth reference voltage and the fifth reference voltage, for receiving the input signal and generating a second driving signal according to the input signal, wherein the fifth reference voltage is between the third reference voltage and the fourth reference voltage; and
a combiner, coupled to the first driving unit and the second driving unit, for generating the driving signal by combining the first driving signal and the second driving signal.

2. The driver of claim 1, wherein the first driving unit comprises:
a first level shifter, for receiving the input signal and generating a first shifted signal according to the third reference voltage and the fifth reference voltage; and
a first digital analog converter (DAC), coupled to the first level shifter, for receiving the first shifted signal and converting the first shifted signal into the first driving signal.

3. The driver of claim 2, wherein the first driving unit further comprises:
a buffer unit, coupled to the first DAC, for buffering the first driving signal voltage.

4. The driver of claim 2, wherein the second driving unit comprises:
a second level shifter, for receiving the input signal and generating a second shifted signal according to the fourth reference voltage and the fifth reference voltage; and
a second DAC, for receiving the second shifted signal and converting the second shifted signal into the second driving signal.

5. The driver of claim 4, wherein the second driving unit further comprises:
a buffer unit, coupled to the second DAC, for buffering the second driving signal.

6. The driver of claim 1, wherein the light emitting device is an organic light emitting diode (OLED).

7. A driver for driving a light emitting device, comprising:
an output stage, for outputting a driving current to the light emitting device (LED) according to a driving signal; and
a driving stage, coupled to the output stage, for generating the driving signal to the output stage, the driving stage comprising:
a first driving unit, coupled to a first reference voltage and a second reference voltage, for receiving an input signal and generating a first driving signal according to the input signal;
a second driving unit, coupled to a third reference voltage and the second reference voltage, for receiving the input signal and generating a second driving signal according to the input signal, wherein the second reference voltage is between the first reference voltage and the third reference voltage; and
a combiner, coupled to the first driving unit and the second driving unit, for generating the driving signal by combining the first driving signal and the second driving signal.

8. The driver of claim 7, wherein the first driving unit comprises:
- a first level shifter, for receiving the input signal and generating a first shifted signal according to the first reference voltage and the second reference voltage; and
- a first digital analog converter (DAC), coupled to the first level shifter, for receiving the first shifted signal and converting the first shifted signal into the first driving signal.

9. The driver of claim 8, wherein the first driving unit further comprises:
- a buffer unit, coupled to the first DAC, for buffering the first driving signal voltage.

10. The driver of claim 8, wherein the second driving unit comprises:
- a second level shifter, for receiving the input signal and generating a second shifted signal according to the third reference voltage and the second reference voltage; and
- a second DAC, for receiving the second shifted signal and converting the second shifted signal into the second driving signal.

11. The driver of claim 10, wherein the second driving unit further comprises:
- a buffer unit, coupled to the second DAC, for buffering the second driving signal.

12. The driver of claim 7, wherein the light emitting device is an organic light emitting diode (OLED).

* * * * *